July 7, 1925.
A. D. ROBBINS
1,545,067
TORQUE ARM FOR DUAL AXLES
Filed Feb. 3, 1925
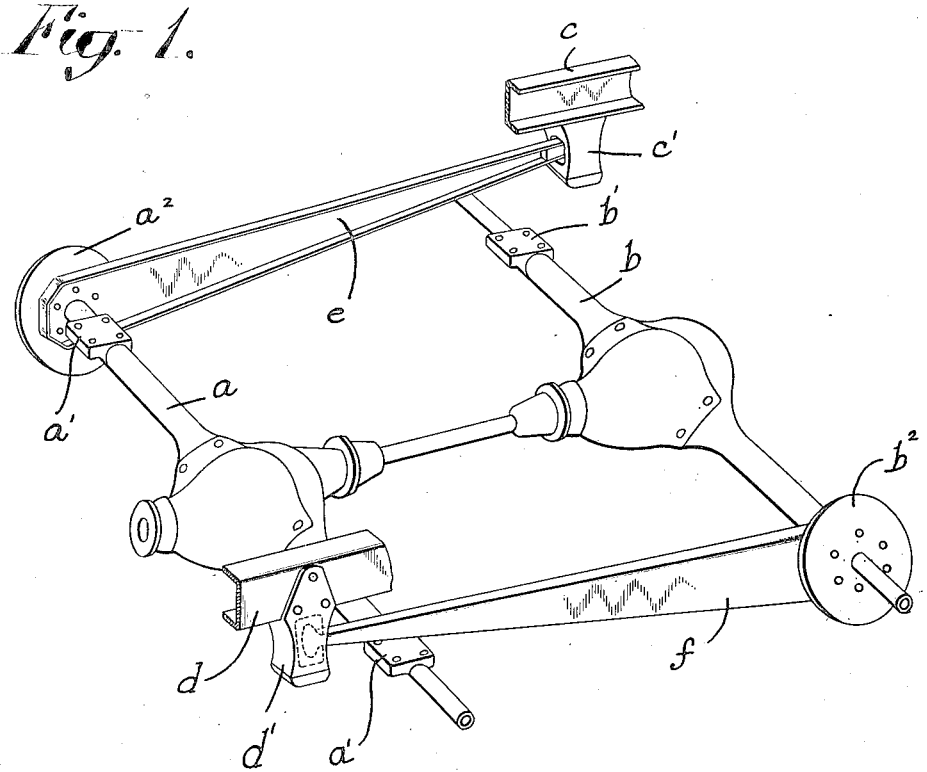
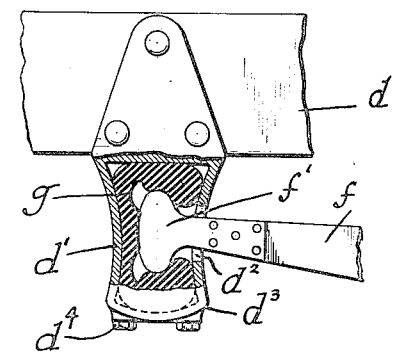
Inventor
Azor D. Robbins
By his Attorneys.
Redding, Greeley, O'Shea & Campbell Patented July 7, 1925.

1,545,067

UNITED STATES PATENT OFFICE.

AZOR D. ROBBINS, OF NEW YORK, N. Y., ASSIGNOR TO INTERNATIONAL MOTOR COMPANY, OF NEW YORK, N. Y., A CORPORATION OF DELAWARE.

TORQUE ARM FOR DUAL AXLES.

Application filed February 3, 1925. Serial No. 6,517.

*To all whom it may concern:*

Be it known that I, AZOR D. ROBBINS, a citizen of the Commonwealth of Australia, residing in the borough of Manhattan of the city of New York, in the State of New York, have invented certain new and useful Improvements in Torque Arms for Dual Axles, of which the following is a specification, reference being had to the accompanying drawing, forming a part hereof.

This invention relates to torque arms used in connection with the axles of motor vehicles and particularly to torque arms used in connection with a pair of adjacent axles with provision for a degree of universality between the axles. It has heretofore been proposed to rigidly secure torque arms to alternate axles at alternate ends and provide connections between the free ends of the arms and the alternate axles which afford a degree of universal movement whereby a semi-rigid structure is afforded capable of accommodating itself to inequalities in the roadway. When the brakes are applied to all four wheels in a structure of this nature it has been found, in some circumstances, that the rearwardly disposed axle has a tendency to turn about the forwardly disposed axle with the result that the rearwardly disposed pair of wheels are lifted off the ground to the detriment of the braking action afforded. It is proposed according to the present invention to rigidly secure torque arms to alternate axles of a pair and at alternate ends but to secure the free ends of the arms to the chassis frame with connections affording a degree of universal movement whereby a non-rigid assembly is provided having all the advantages of compensation for inequalities in the roadway with none of the disadvantages inherent in the previous construction. More particularly the free ends of the respective torque arms are engaged by yielding non-metallic material retained within housings carried with the chassis frame in the region of the respective axles and preferably the connection affording universal movement is disposed upon the opposite side of the axle. In order that the invention may be clearly understood the same will now be described more fully with reference to the accompanying drawing illustrating a preferred embodiment thereof in which:

Figure 1 is a view in perspective showing a pair of driving axles to which the invention is applied, parts being removed in the interest of clearness.

Figure 2 is a fragmentary view showing the connection between the end of a torque arm and the chassis frame wherein yielding non-metallic material engages the end of the arm and is disposed within a housing carried with the frame, parts being removed in the interest of clearness.

In Figure 1 a pair of adjacent axles are illustrated at $a$, $b$, respectively. These axles are illustrated as adapted to carry driving wheels but it is to be understood that the invention is equally applicable to a pair of similarly disposed axles adapted to carry steering wheels. Fragmentary portions of the longitudinal side frame members of the chassis are indicated at $c$, $d$, the chassis frame being adapted to be supported from the axle as by springs secured to the spring seats $a'$, $b'$. Upon alternate ends of axles $a$ and $b$ there are disclosed vertically disposed plates $a^2$, $b^2$ which may serve as closures for the brake drum housings and supports for the brake shoes. The closures at the opposite ends of the respective axles have been omitted in the interest of clearness. Secured to the plates $a^2$ and $b^2$ which are carried upon alternate ends of the axles $a$ and $b$, respectively, are torque arms $e$ and $f$, respectively. Torque arm $e$ is shown as secured to the plate $a^2$ of the forwardly disposed axle $a$ and extends rearwardly above the end of axle $b$. The end of arm $e$ enters a housing $c'$ secured in any convenient manner to the chassis side frame member $c$. Within housing $c'$ is disposed yielding non-metallic material which engages the end of arm $e$ in a manner which will be described more fully hereinafter in connection with the description of Figure 2. Preferably housing $c'$ is disposed in rear of the vertical transverse plane including the axis of axle $b$, the arm being of a length to permit this disposition of parts.

Torque arm $f$ is illustrated as secured to the plate $b^2$ carried with the rearwardly disposed axle $b$ and extends forwardly and above the end of axle *a* opposite to that to which the arm *e* is secured. The end of arm *f* enters in similar manner an opening in the side of a housing *d'* carried with the side frame member *d*. Housing *d'* is preferably disposed just forwardly of the axle *a* as clearly illustrated in the drawing.

The ends of the respective arms are secured to the respective side frame members of the chassis by yielding non-metallic connections of the general type illustrated in the patent to Masury and Leipert, No. 1,404,876 dated January 31, 1922. In Figure 2 the arm *f* is illustrated as provided with an enlarged end *f'* which is disposed within the housing *d'*, the arm *f* entering through the opening $d^2$ of the housing. Within the housing *d'* is disposed a block of yielding non-metallic material *g* which engages the end of the arm *f* as illustrated. For convenience in assembly the lower face of housing *d'* is open and is adapted to be closed by a cap $d^3$ secured to the housing by means of bolts or the like $d^4$. The yielding non-metallic material preferably takes the form of a rubber block and when disposed within the housing is retained under conditions of internal static pressure by means of the cap $d^3$ and bolts $d^4$ whereby its strength, resiliency and wearing qualities are improved.

The construction illustrated provides ample reacting elements for the axles to resist driving and braking torque. The yielding non-metallic connections between the ends of the torque arms afford a degree of universal movement whereby relative movement is permitted between the respective axles whereby variations in the relative elevations of the respective wheels due to inequalities in the roadway are compensated for.

Various modifications may be made in the manner of securing the torque arms to the respective wheels as well as in the construction and disposition of the torque arms connections which afford universal movement with respect to the chassis frame and no limitation is intended by the foregoing description or accompanying drawing except as indicated in the appended claims.

What I claim is:

1. The combination with the frame of a self-propelled vehicle and a pair of axles, of an arm secured adjacent one end of one axle, a connection between the free end of the arm and the chassis frame, an arm secured adjacent the opposite end of the other axle, and a connection between the free end of the second named arm and the chassis frame.

2. The combination with the frame of a self-propelled vehicle and a pair of axles, of an arm secured adjacent one end of one axle, a connection affording universal movement between the free end of the arm and the chassis frame, an arm secured adjacent the opposite end of the other axle, and a connection affording universal movement between the free end of the second named arm and the chassis frame.

3. The combination with the frame of a self-propelled vehicle and a pair of axles, of an arm secured adjacent on end of one axle, a yielding non-metallic connection between the free end of the arm and the chassis frame, an arm secured adjacent the opposite end of the other axle, and a yielding non-metallic connection between the free end of the second named arm and the chassis frame.

4. The combination with the frame of a self-propelled vehicle and a pair of axles, of an arm secured adjacent one end of one axle, a connection between the free end of the arm and the chassis frame including yielding non-metallic material carried with the frame and engaging the end of the arm, an arm secured adjacent the opposite end of the other axle, and a connection between the free end of the second named arm and the chassis frame, and including yielding non-metallic material carried with the frame and engaging the end of the arm.

5. The combination with the frame of a self-propelled vehicle and a pair of axles, of an arm secured adjacent one end of one axle, a connection between the free end of the arm and the chassis frame, and comprising yielding non-metallic material retained under compression carried with the chassis frame and engaging the end of the arm, an arm secured adjacent the opposite end of the free axle, and a connection between the free end of the second named arm and the chassis frame, and comprising yielding non-metallic material maintained under compression carried with the chassis frame and engaging the end of the arm.

6. The combination with the frame of a self-propelled vehicle and a pair of axles, of an arm secured adjacent one end of one axle, a connection between the free end of the arm and the chassis frame adjacent the other of the pair of axles, an arm secured adjacent the opposite end of the other axle, and a connection between the free end of the second named arm and the chassis frame adjacent the first named of the pair of axles.

7. The combination with the frame of a self-propelled vehicle and a pair of axles, of an arm secured adjacent one end of one axle, a housing carried with the frame and having an open side into which the free end of the arm extends, yielding non-metallic material retained within the housing and engaging the end of the arm, an arm secured adjacent the opposite end of the other axle, a housing carried with the frame and having an open side into which the free end of the second named arm extends, and yielding non-metallic material disposed within the housing and engaging the end of the arm.

8. The combination with the frame of a self-propelled vehicle and a pair of axles, of an arm secured adjacent one end of one axle, a housing carried with the frame and having an open side into which the free end of the arm extends, yielding non-metallic material retained within the housing and engaging the end of the arm, an arm secured adjacent the opposite end of the other axle, a housing carried with the frame and having an open side into which the free end of the second named arm extends, and yielding non-metallic material disposed within the housing under compression and engaging the end of the arm.

This specification signed this 29th day of January A. D. 1925.

AZOR D. ROBBINS.